July 5, 1955
F. H. WINSLOW
2,712,536
PRODUCTION OF POLYMER SPHERES
Filed Aug. 30, 1950
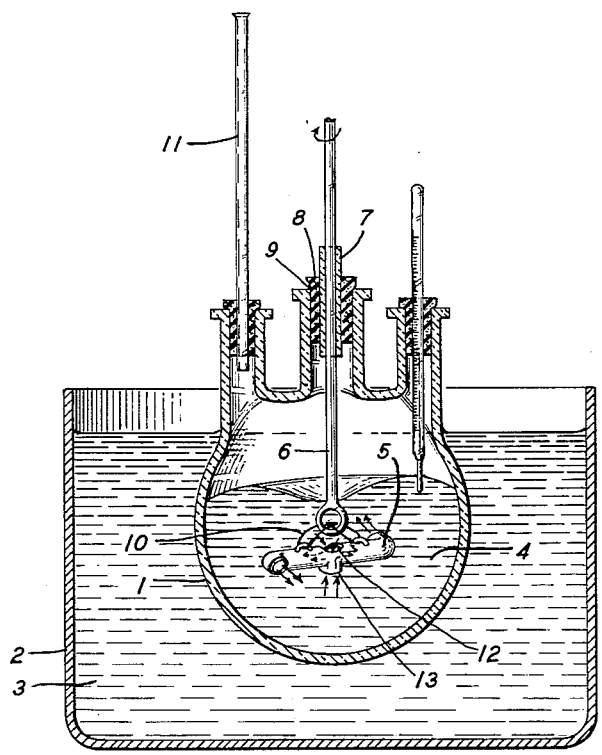
INVENTOR
F. H. WINSLOW
BY
Edwin B. Cave
ATTORNEY

United States Patent Office 2,712,536
Patented July 5, 1955

2,712,536

PRODUCTION OF POLYMER SPHERES

Field H. Winslow, Springdale, N. J., assignor to Bell Telephone Laboratories, Incorporated, New York, N. Y., a corporation of New York Application August 30, 1950, Serial No. 182,309

4 Claims. (Cl. 260—45.5)

This invention relates to methods of forming small bodies of spherical shape composed of organic polymers. More particularly it relates to methods of carrying out the polymerization of polymerizable liquids in suspension in a non-solvent liquid in such manner as to form solid polymer spheres of controllable size.

Suspension polymerization, wherein monomeric compounds are polymerized as droplets in suspension in an aqueous medium, has been employed on a substantial scale for the preparation of thermoplastic polymers in the form of small particles, as for use as molding powders. For such a purpose, the shape and uniformity of size of the particles is not of great significance. However, for certain uses, essentially spherical particles of substantially uniform size and having smooth surfaces are required. It is important in the preparation of particles for these uses that the product obtained by suspension polymerization be as free as possible of non-spherical particles and of particles outside the desired size range so as to simplify the problem of separation and to reduce the proportion of discarded material. It is also important that the surfaces of the particles be smooth and be free of difficultly removable solid contaminants.

In the process of the present invention, polymerization of polymerizable liquids is carried out in aqueous suspension under conditions such that a high proportion of the polymer particles produced are spherical and fall within a prescribed range of particle diameter and such that clear, smooth surfaces are obtained. For certain purposes, a typical optimum diameter for polymer bodies for such a use is about 0.3 millimeter and the present invention will be described with regard to the preparation of polymer bodies approximating this average size and also with regard to the selective preparation of other sizes within a substantial range, to which the invention is applicable.

The accompanying drawing is a front elevation, in section, of a form of apparatus in which the process of the present invention can be carried out on a laboratory scale. Larger apparatus of analogous functional structure can be used for carrying out the process on a larger scale.

In the apparatus shown in the drawing, a reaction vessel 1 is suspended within an outer vessel 2 containing a body of water 3 which acts as a controlled temperature bath. The mixture 4, made up of aqueous medium containing the suspended bodies of polymerizable material, is contained within the reaction vessel 1. The polymerizable material is maintained in suspension by means of a rotary stirrer 5, which is shown so positioned within the reaction vessel in the drawing that it is in perspective. The stirrer 5 is carried on a rotatable vertical shaft 6 which passes out of the reaction vessel through a sleeve 7 fitting tightly in the opening of a stopper 8 closing an opening 9 in the reaction vessel. The shaft 6 and, with it, the stirrer 5 are rotated by a rotary power source (not shown).

The stirrer 5 is flexibly mounted on the end of the shaft 6, as by a wire 10, formed of an inactive metal, such as Nichrome, so that it may be tilted to permit its insertion and withdrawal through the opening 9, which does not have a diameter as large as the length of the stirrer. The structure of the stirrer will be described in more detail below.

An open tube 11 is provided which leads into and extends above the reaction vessel and which serves as a reflux condenser.

In the operation of the process, the aqueous suspending medium, having a small percentage of polyvinyl alcohol dissolved therein as a suspension agent, is placed in the reaction vessel together with the required amount of the polymerizable liquid containing a small amount of a polymerization catalyst. The stirrer is rotated at a speed sufficient to disperse the polymerizable liquid in the form of small drops throughout the aqueous medium. The temperature of the mixture is maintained at a point at which polymerization proceeds at the required rate. Agitation of the mixture with the stirrer is continued until the suspended material has polymerized to a rigid, non-tacky state. The polymerized particles are then separated from the aqueous medium and dried. The non-spherical particles and the particles not falling within the required size range are then removed from the product.

Of the polymerizable substances which can be prepared in spherical form by this process, the most suitable are the normally liquid vinylidene monomers, and particularly the vinyl monomers. The term vinylidene is used herein as generic to the term vinyl. Thus methyl methacrylate and styrene and its derivatives, particularly those derivatives in which alkyl or halogen radicals are substituted on the benzene ring, are particularly adapted to be polymerized by this process. Spheres of a particularly hard, clear and smooth surface are obtained by the polymerization of monomers having a functionality in excess of 2 or of mixtures of such monomers with bifunctional monomers. Divinyl benzene alone or mixed with a bifunctional monomer, such as styrene or ethyl vinyl benzene, is particularly effective. When it is desired to obtain the benefits of cross-linking, it is ordinarily desirable that at least 5 per cent by weight of the monomer having a functionality greater than 2, such as divinyl benzene, be present.

In general, the polymerizable liquid employed should have a boiling point sufficiently high and a vapor pressure sufficiently low to permit effective operation at a temperature at which polymerization proceeds at a reasonable rate, without the necessity of operating at superatmospheric pressure and without excessive volatilization of the material. Materials boiling above about 100° C. are ordinarily satisfactory. Obviously, if necessary, low boiling materials can be used and the process can be carried out at superatmospheric pressures.

It is also desirable that the density of the material to be polymerized approximate that of the suspending medium in order to reduce the settling tendency of the suspended material. The material to be polymerized should obviously be substantially insoluble in the suspending medium. A commercially available mixture of polymerizable materials which has been found very suitable is made up of a mixture containing about 8 parts by weight of a mixture of the three isomers of divinyl benzene and about 7 parts by weight of ethyl vinyl benzene. This mixture has a boiling point of about 195° C., a specific gravity at 25° C. of about 0.92 and a viscosity of about one centipoise at 25° C.

Of the various conventional catalysts for the polymerization of vinyl type polymers which may be used in carrying out the process, benzoyl peroxide has been found the most suitable. About one per cent by weight of the catalyst, based on the weight of the material to be polymerized yields good results, but obviously smaller or larger amounts, as between about 0.2 per cent and 5 per cent, can be used.

The medium in which the polymerizable material, containing the polymerization catalyst, is suspended ordinarily consists of water having the polyvinyl alcohol suspension agent dissolved therein. However, when the specific gravity of the suspended liquid is greater than that of water, it may sometimes be desirable to increase the specific gravity of the water used as the suspending medium by dissolving in it up to about 20 per cent by weight of certain water soluble inorganic substances, such as sodium chloride, sodium nitrate, sodium dihydrogen phosphate and ammonium chloride.

In order to obtain a high yield of spherical particles, it is necessary that the volume of the aqueous suspending medium be substantially greater than the volume of the polymerizable liquid in the reaction vessel. The volume of the aqueous medium should be at least 5 times that of the polymerizable liquid in order to avoid excessive clustering of the spheres which are produced. Preferably the volume of the aqueous medium is between 10 and 15 times that of the polymerizable material. Larger ratios, for instance up to 20 to 1 or 50 to 1, may be used if desired but without substantial additional beneficial effect.

The nature of the agitation to which the mixture in the reaction vessel is subjected need only be such that the substance undergoing polymerization is maintained in suspension with as fine a particle size as desired. This is ordinarily accomplished by stirring under conditions such as to generate a high rate of shear.

In the apparatus shown in the drawing, adequate agitation is created by rotating the horizontally disposed stirring member 5 at a sufficient speed. An efficient dispersion is promoted, particularly where the density of the dispersed material is lower than that of the suspension medium, by the use of a stirring member constructed as shown in the drawing.

The stirrer 5 is formed of an open-ended horizontally disposed tube having each end turned at a right angle so that it trails away from the normal direction of rotation. At the center of the tube, an opening 12 is formed in the top and an opening 13 is formed in the bottom. When the stirrer is rotated, the aqueous medium together with the suspended material is drawn in through the holes 12 and 13 and is discharged through the openings at the ends of the tube. When the liquid to be polymerized has a density lower than that of the suspension medium, it tends to collect at the vortex of the rotating liquid mass in the reaction vessel. With a stirrer of the type shown in the drawing, this material collected at the vortex is redispersed throughout the liquid mass.

The aqueous medium containing the suspended polymerizable material is maintained at a temperature at which polymerization proceeds at a practical rate. Temperatures between 75° C. and 85° C. have been found particularly satisfactory but higher or lower temperatures may be employed, as for instance between 60° C. and 100° C.

In order to promote the formation of spherical particles and to minimize the clustering of spheres, it is necessary that a stabilizer or suspension agent be present in the aqueous medium during the course of the polymerization. Investigation of the mechanism of the dispersion of the polymerizable liquid into the form of globules in the aqueous medium and its maintenance in that form by agitation has shown that, so long as the globules are formed of an essentially liquid substance, they remain in dynamic equilibrium with each other. As the globules float through the aqueous vehicle, collisions with their neighbors are frequent enough to result in a continual and rapid interchange.

This mutual integration and division of globules can be demonstrated simply by adding a monomer, colored with a dye, to a stirred suspension of uncolored monomer. In an extremely short time the globules will be evenly tinted throughout with dye. Addition of a stabilizer has no noticeable effect on this interchange during the early stages of the reaction.

As the polymerization proceeds, the globules eventually reach a stage at which they are coherent masses capable of retaining their identity in the suspension but at which they are still tacky and not completely rigid. When the polymerizable liquid contains a substantial amount of a monomer having a functionality greater than 2, this point coincides with the onset of gelation, which occurs at a low degree of over-all polymerization.

It is virtually impossible to prevent agglomeration of the sticky globules as they pass through this stage unless they are enveloped with a surface covering of a stabilizer. According to the present invention, polyvinyl alcohol of a particular range of degree of hydrolysis and of a particular range of viscosity is dissolved in the aqueous medium not only to prevent excessive agglomeration of the globules but also to permit the process to be carried out in such manner that as high a proportion as possible of the product falls within the desired size range.

Polyvinyl alcohol is manufactured by the hydrolysis of polyvinyl acetate and may have all or only part of its acetate linkages hydrolyzed. Polyvinyl alcohol is available in forms in which the degree of hydrolysis lies between about 75 per cent and 100 per cent. The solution viscosity of polyvinyl alcohol varies over a wide range and gives an indication of its average molecular weight. Both the degree of hydrolysis and the viscosity have an important effect upon the behavior of the polyvinyl alcohol as a stabilizer.

It has been found that by using as a stabilizer a polyvinyl alcohol having a degree of hydrolysis above 95 per cent, and preferably of at least 98 per cent, and an intrinsic viscosity in aqueous solution between about 0.60 and 0.90, a high yield of unagglomerated spheres, the greater proportion of which have a size falling within the desired range, can be obtained over a wide range of stabilizer concentrations when the average sphere size which is required falls within the range of about .05 millimeter and 1.5 millimeters.

Using this stabilizer, the average particle size produced can be varied within this range by varying the degree of agitation and to a lesser extent the concentration of the stabilizer in the aqueous medium. Increasing the agitation and increasing the concentration both tend to decrease the particle size. To obtain a particle size below about .05 millimeter, the amount of power required to agitate the mixture becomes excessive. At the upper end of the particle size range, if the amount of stabilizer is reduced sufficiently to permit the formation of particles substantially larger than 1.5 millimeters, the effectiveness of the stabilizer in preventing agglomeration decreases.

The selective action of this stabilizer can be shown by a preparation in which the conditions of operation were controlled so as to produce as high a yield as possible of particles having a size approximating 0.3 millimeter. A mixture of about 8 parts by weight of mixed isomers of divinyl benzene with about 7 parts by weight of ethyl vinyl benzene, to which about one per cent by weight of benzoyl peroxide had been added, was suspended, in the apparatus described above, in water having dissolved therein a polyvinyl alcohol having a degree of hydrolysis of 98 per cent and an intrinsic viscosity of about 0.82. The volume of water present was about 13 times the volume of material to be polymerized. The temperature of the suspension was maintained at about 80° C. After about four hours, when the suspended material had polymerized to form rigid, non-tacky particles, the particles were separated from the suspension medium, dried and sieved.

The sieving was carried out by passing the mass of particles successively through a No. 12 sieve (Standard Screen Scale) having openings of 1.68 millimeters, a No.

20 sieve having openings of 0.84 millimeter, a No. 40 sieve having openings of 0.42 millimeter, and a No. 60 sieve having openings of 0.25 millimeter. It was the fraction passing the No. 40 sieve but retained on the No. 60 sieve (having a diameter lying between 0.25 millimeter and 0.42 millimeter) which this particular preparation was controlled to produce in as large a quantity as possible.

With a concentration of polyvinyl alcohol equivalent to 2 per cent polyvinyl alcohol based on the weight of the material to be polymerized, the desired fraction falling within the size range indicated above constituted over 90 per cent by weight of the total product and, out of this fraction, 95 per cent of the particles were unagglomerated spheres. The remainder of the product was distributed between the next higher and the lower size range.

With a concentration of 0.5 per cent polyvinyl alcohol based on the weight of the material to be polymerized, over 70 per cent of the product fell within the desired range and 99 per cent of this fraction was made up of unagglomerated spheres.

In general, satisfactory yields can be obtained with polyvinyl alcohol having a degree of hydrolysis and an intrinsic viscosity falling within the range set forth above, in concentrations varying between 0.25 per cent and 5 per cent, and preferably between 0.5 per cent and 2 per cent, based on the weight of the polymerizable material, where the selective production of a particle size having an average diameter between .05 millimeter and 1.5 millimeter is desired. The amount of agitation to be employed is determined by trial and will vary with the structure of the reaction vessel and the stirring means.

Over a more limited range of concentrations, substantial selectivity within the size ranges set forth above can be obtained with polyvinyl alcohol having somewhat lower intrinsic viscosity values than those set forth above. Thus, if the concentration of the polyvinyl alcohol is maintained in excess of 1 per cent, and preferably in excess of 1.5 per cent, based on the weight of the polymerizable material, good yields within a selected narrow size range can be obtained with intrinsic viscosities as low as .30 (and degrees of hydrolysis in excess of 95 per cent, and preferably of at least 98 per cent).

As an example of the yields obtained with polyvinyl alcohols having lower viscosities, when operating within the more limited range of concentration, a batch of polymer spheres was prepared under the same conditions as described above except that the polyvinyl alcohol had an intrinsic viscosity of 0.34 (and a degree of hydrolysis of 98 per cent) and was present in a concentration of 2 per cent, based on the weight of the polymerizable material. Of the total product, about 80 per cent fell within the size range of 0.25 millimeter and 0.42 millimeter, and of the particles falling within this size about 90 per cent were unagglomerated spheres.

When the process was carried out with the same polyvinyl alcohol present in a concentration of only 0.5 per cent, only about 45 per cent of the product fell within the required size range and only about 80 per cent of this fraction was formed of unagglomerated spheres.

Thus, within the more restricted range of concentrations lying between about 1 per cent, or preferably 1.5 per cent, and about 5 per cent, based on the weight of polymerizable liquid, good selective yield can be obtained, for average diameters lying between 0.05 millimeter and 1.5 millimeters, using polyvinyl alcohols having intrinsic viscosities between about 0.3 and about 0.9 and having degrees of hydrolysis in excess of 95 per cent and preferably of at least 98 per cent. With polyvinyl alcohols having intrinsic viscosities of between about 0.6 and 0.9, preferably between 0.7 and 0.85, and more preferably of about 0.8, satisfactory results can be obtained with concentrations between about 0.25 per cent and about 5 per cent, based on the weight of the polymerizable material.

In general, other conditions being the same, the use of lower viscosity grades of polyvinyl alcohol tends to favor the formation of larger spheres but the tendency to agglomerate is higher. The higher viscosity polyvinyl alcohols produce a higher ratio of spheres to agglomerate at moderate or high concentrations, but at low concentrations are not even as effective stabilizers as the lower viscosity materials. Use of polyvinyl alcohols of lower degree of hydrolysis results, in general, in a smaller particle size.

When water without other dissolved material is used as the suspension medium, no control over pH is ordinarily necessary. In a typical run, using tap water having a pH of 6.5, the pH of the suspension had been reduced to between 4.8 and 5.0 by the end of the run. The reduction in pH can be attributed to the dissolving of the inhibitor originally present in the polymerizable material and of the degradation products of the catalyst. Tests made with a controlled pH have shown that, with a pH below 3, agglomeration becomes a problem. Increasing the pH above 7 had little effect on the stabilizing action but caused a cloudiness of the spheres, suggesting occluded impurities and surface roughness. A pH range between 3 and 7 is the most satisfactory.

The invention has been described in terms of its specific embodiments and, since certain modifications and equivalents may be apparent to those skilled in the art, the description above is intended to be illustrative of, but not necessarily to constitute a limitation upon, the scope of the invention.

What is claimed is:

1. A process of forming a high yield of small spherical bodies of a rigid polymer falling within a relatively narrow range of size distribution from a polymerizable liquid consisting essentially of a mixture of divinyl benzene and a monovinyl aromatic hydrocarbon which process comprises continuously agitating a mixture of said polymerizable liquid with at least 5 times as much by volume of an aqueous medium having dissolved therein a stabilizing agent comprising polyvinyl alcohol having a degree of hydrolysis of at least 98 per cent and an intrinsic viscosity, in aqueous solution, between 0.7 and 0.85, said polyvinyl alcohol being present in the suspension in an amount between 0.25 per cent and 5 per cent, based on the weight of the polymerizable material, so as to form a suspension of fine spherical globules of said polymerizable material in said aqueous medium, and maintaining said suspension at a polymerizing temperature until said polymerizable liquid has polymerized in the form of suspended spheres, to a rigid, non-tacky state.

2. A process of forming a high yield of small spherical bodies of a rigid polymer falling within a relatively narrow range of size distribution from a polymerizable liquid consisting essentially of a mixture of divinyl benzene and ethyl vinyl benzene which process comprises continuously agitating a mixture of said polymerizable liquid with at least 5 times as much by volume of an aqueous medium having dissolved therein a stabilizing agent comprising polyvinyl alcohol having a degree of hydrolysis of at least 95 per cent and an intrinsic viscosity, in aqueous solution, between about 0.6 and 0.9, so as to form a suspension of fine spherical globules of said polymerizable liquid in said aqueous medium, and maintaining said suspension at a polymerizing temperature until said polymerizable liquid has polymerized, in the form of suspended spheres, to a rigid, non-tacky state.

3. A process of forming small spherical bodies of a rigid polymer from a mixture of divinyl benzene monomer and ethylvinyl benzene monomer containing benzoyl peroxide as a polymerization catalyst comprising continuously stirring said mixture of monomers together with a volume of water between about 10 and about 15 times the volume of the monomer mixture at a rate sufficient to form a suspension of fine spherical globules of said monomer mixture in said water, said water having dissolved therein about 2 per cent, based on the weight of said monomer mixture, of a polyvinyl alcohol having a degree of hydrolysis of about 98 per cent and an intrinsic viscosity of about .8, maintaining said suspension at a temperature in the vicinity of 80° C. until said monomer mixture has polymerized, in the form of suspended spheres, to a rigid non-tacky state, while maintaining the pH of the suspension at a value between 3 and 7, and separating the resulting polymer spheres from the suspension.

4. A process of forming a high yield of small spherical bodies of a rigid polymer falling within a relatively narrow range of size distribution from a polymerizable liquid consisting of a mixture of divinyl benzene and ethylvinyl benzene which process comprises continuously agitating a mixture of said polymerizable liquid with at least 5 times as much by volume of an aqueous medium having dissolved therein between about 1 per cent and about 5 per cent, based on the weight of the polymerizable liquid, of a stabilizing agent comprising polyvinyl alcohol having a degree of hydrolysis in excess of 95 per cent and an intrinsic viscosity, in aqueous solution, between 0.3 and 0.9, so as to form a suspension of fine spherical globules of said polymerizable liquid in said aqueous medium and maintaining said suspension at a polymerizing temperature until said polymerizable liquid has polymerized, in the form of suspended spheres, to a rigid, non-tacky state.

References Cited in the file of this patent

UNITED STATES PATENTS

| | | |
|---|---|---|
| 2,089,444 | Staudinger | Aug. 10, 1937 |
| 2,440,808 | Neher | May 4, 1948 |
| 2,462,354 | Brubaker | Feb. 22, 1949 |
| 2,535,189 | Benson et al. | Dec. 26, 1950 |

OTHER REFERENCES

Du Pont "Elvanol" Bulletin (1947), pages 5, 20, 21 and 40.